G. F. RUSSELL.
Assignor to the AMERICAN SULPHITE PULP COMPANY.
PULP DIGESTER.
No. 11,282. Reissued Nov. 15, 1892.
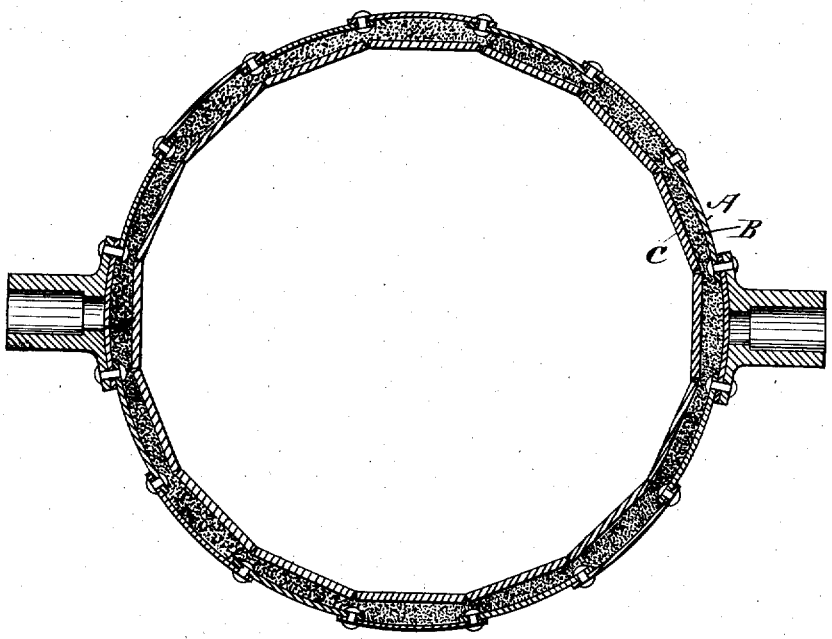
WITNESSES.
John H. Taylor.
Ellen B. Tomlinson.
INVENTOR.
George F. Russell
by Alex. P. Browne,
attorney.

UNITED STATES PATENT OFFICE.

GEORGE F. RUSSELL, OF LAWRENCE, ASSIGNOR TO THE AMERICAN SULPHITE PULP COMPANY, OF BOSTON, MASSACHUSETTS.

PULP-DIGESTER.

SPECIFICATION forming part of Reissued Letters Patent No. 11,282, dated November 15, 1892.

Original No. 445,235, dated January 27, 1891. Application for reissue filed June 24, 1892. Serial No. 437,925.

*To all whom it may concern:*

Be it known that I, GEORGE F. RUSSELL, a citizen of the United States, residing at Lawrence, in the county of Essex and State of Massachusetts, have invented certain new and useful Improvements in Pulp-Digesters, of which the following is a specification.

My invention relates to improvements in the construction of the vessels ordinarily called "digesters," in which wood pulp is manufactured by what is known as the "sulphite process." Its object is to improve the construction of these digesters so as to prevent their injury by the solution employed.

In the accompanying drawing I have represented in vertical section a pulp-digester of a well-known form, commonly called the "Globe rotary." The shell of the digester is marked A, and within it are shown linings B and C, the construction whereof I will now proceed to describe.

A represents the outer shell of the digester. It is ordinarily constructed of metal—such as iron, steel, or brass—which is liable to be injuriously affected by the acid solution employed. Upon the interior of the shell of the digester I form a continuous lining or coat B of acid-resisting material, applied in a plastic condition. This lining or coat is of the nature of a cement, and may be composed of any material or mixture of materials which is acid-resisting and capable of being made plastic and adhesive to the shell of the digester and so compact as to prevent the acid solution from reaching the iron shell in consequence of the high steam-pressure required in practice. A convenient material for the purpose is commercial cement, preferably Portland, made plastic with water and applied with any suitable implement upon the interior of the digester-shell, so as to form a continuous covering therefor. Other cement-like materials or mixtures having similar properties or characteristics may be used, such as the ordinary cement mixtures, sand, and Portland cement, sand, and tar, and the like. The thickness of the cement lining when compacted as it is by laying on with a trowel will vary more or less according to the different materials used. In practice I find that with a lining composed of sand and Portland cement a layer of from three to five inches suffices to prevent the acid from reaching the metal shell.

Under some circumstances it will be found in practice that the friction of the mass of pulp within the digester, particularly when of the rotary pattern, is likely to mechanically wear away the lining constructed as described. This objectionable feature may be remedied by setting an inner lining C of tiles upon the continuous lining B, the plasticity and adhesiveness of which may be utilized to hold the tiles in place. In many cases, however, the use of this inner lining of tiles will not be found necessary.

While I have represented but one form of digester in the drawing, it will be understood that my improvement is not confined to that form alone, but is of general application.

I am aware of the use heretofore of a digester-lining comprising a layer or coat of masonry or brickwork laid in cement, and make no claim thereto. Such linings I believe to be objectionable, in that they are heavy and require in many forms of digester special forms of tile or brick to be constructed to fit various portions of the digester-shell, especially around openings, &c. Furthermore, they are expensive by reason of requiring to be laid with great care and skill to prevent defective joints through which leakage may take place. On the other hand, in a digester embodying my improvements the lining may be applied rapidly and easily, and may be composed of material not necessarily expensive. Again, it has been customary to supplement the brick or tile linings heretofore in use with a lining of sheet lead interposed between the brick or tile lining and the digester-shell. This feature may be entirely dispensed with where my improvement is adopted.

I mean to be understood that the digester-linings comprising a layer or coat of masonry or brickwork laid in cement, to which I have just referred, have always been, so far as I know, supplemented by a lining of sheet lead interposed between the brick or tile lining and the digester-shell. The construction I refer to as old is that shown and described in the United States Letters Patent to Mitscherlich, No. 284,319, dated September 4, 1883, in which the digester-shell is protected from the acid solution by a sheet-lead lining, and the only apparent use of the brick or tile lining in addition to the lead lining is to protect the latter from extreme high temperatures.

I am also aware of the United States patent to Reynolds, No. 423,531, dated March 18, 1890, which describes a digester having a metal shell and an interior structure of brick with leaded joints, a "fluid-chamber" or space being left between the shell and the brick structure. The patent contemplates the filling of this chamber with fluid—such as air, water, or steam under pressure—in excess of that employed in digesting the pulp, so as thereby to prevent the brick structure from disintegration under pressure from within outward. It also states that the inner surface of the shell may be coated with a paste of red lead, and thus protected against possible injury by acid leaking through the brickwork. Such a structure I consider merely a modification of the Mitscherlich by the addition thereto of the pressure-chamber, the lead paste of Reynolds being the equivalent of the lead sheet of Mitscherlich.

I am aware that cement linings have been employed in various open vessels used for heating acid solutions; but in such open vessels the temperature never exceeds 212°. In digesting wood pulp by the sulphite process the contents of the digester are under very high steam pressure, sometimes as much as one hundred pounds to the square inch, and I believe it to have been unknown until demonstrated by me that a cement lining would stop the passage of the acid solution to the digester-shell, notwithstanding this high pressure and temperature.

I claim

1. The improved pulp-digester herein described, having an outer shell A and a continuous lining or coat B of cement, as described, applied to the interior of the said shell, for the purpose set forth.

2. The improved pulp-digester herein described, having an outer shell A, a continuous lining or coat B of cement, substantially as described, applied to the interior of the said shell, and an interior lining of tiles C, all substantially as set forth.

In testimony whereof I have hereunto subscribed my name this 18th day of April, A. D. 1892.

GEORGE F. RUSSELL.

Witnesses:
JOHN H. TAYLOR,
ELLEN B. TOMLINSON.